United States Patent
Liu et al.

(10) Patent No.: US 8,553,758 B2
(45) Date of Patent: Oct. 8, 2013

(54) MOTION PARAMETER ENGINE FOR TRUE MOTION

(75) Inventors: Ming-Chang Liu, San Jose, CA (US); Peng Lin, Pleasanton, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1782 days.

(21) Appl. No.: 11/713,323

(22) Filed: Mar. 2, 2007

(65) Prior Publication Data
US 2008/0212676 A1 Sep. 4, 2008

(51) Int. Cl.
*H04N 11/04* (2006.01)
*H04B 1/66* (2006.01)

(52) U.S. Cl.
USPC ............... 375/240; 375/240.16; 375/240.18; 375/E7.106; 375/E7.113; 375/E7.119; 375/E7.122; 375/E7.211; 382/236; 382/238; 382/243; 348/699

(58) Field of Classification Search
USPC ......................................................... 375/240
See application file for complete search history.

(56) References Cited

U.S. PATENT DOCUMENTS

| | | | |
|---|---|---|---|
| 5,094,899 A | 3/1992 | Rusek, Jr. | |
| 5,635,994 A | 6/1997 | Drexler et al. | 348/699 |
| 5,638,128 A | 6/1997 | Hoogenboom et al. | |
| 5,642,166 A | 6/1997 | Shin et al. | 348/416 |
| 5,734,743 A * | 3/1998 | Matsugu et al. | 382/154 |
| 5,852,475 A | 12/1998 | Gupta et al. | |
| 5,880,784 A * | 3/1999 | Lillevold | 375/240.18 |
| 5,990,955 A * | 11/1999 | Koz | 375/240.01 |
| 6,014,181 A | 1/2000 | Sun | |
| 6,081,551 A * | 6/2000 | Etoh | 375/240 |

(Continued)

FOREIGN PATENT DOCUMENTS

| | | | |
|---|---|---|---|
| EP | 0 720 382 B1 | 7/1996 | H04N 7/36 |
| WO | WO 87/05769 | 9/1987 | H04N 5/14 |

(Continued)

OTHER PUBLICATIONS

S.L. Hill and T. Vlachos, "On the estimation of global motion using phase correlation for broadcast applications", Proc. IEEE Int. Conf. Image Processing and Its Applications, vol. 2, pp. 721-725 1999, http://ieeexplore.ieee.org/stamp/stamp.jsp?arnumber=791155.*

(Continued)

*Primary Examiner* — Edan Orgad
*Assistant Examiner* — Ronald Baum
(74) *Attorney, Agent, or Firm* — Haverstock & Owens LLP

(57) ABSTRACT

Local motion estimation is described herein. Each picture of a video is partitioned into blocks for the local motion estimation. An extended-block FFT is calculated for each block, where the extended-block denotes that a certain area around the block is also included for applying FFT. Extending the block for FFT helps to account for the motion of objects that are moving into or out of the block. Phase correlation is applied to attain a set of Motion Vector (MV) candidates for the blocks, and a cost function is evaluated for each MV. If no MV candidate produces a cost function below a pre-defined threshold, a hierarchical variable block matching search is applied and the process is repeated with blocks for finer resolution. Also, predictive MV candidates are used during the block matching search along with temporal constraints tracking to select an MV that yields the minimum cost function.

17 Claims, 8 Drawing Sheets

Variable Block-size Search

(56) References Cited

U.S. PATENT DOCUMENTS

| | | | |
|---|---|---|---|
| 6,181,382 B1 | 1/2001 | Kieu et al. | |
| 6,278,736 B1 | 8/2001 | De Haan et al. | |
| 6,295,367 B1 * | 9/2001 | Crabtree et al. | 382/103 |
| 6,307,886 B1 * | 10/2001 | Westermann | 375/240.09 |
| 6,360,022 B1 | 3/2002 | Lubin et al. | |
| 6,473,462 B1 | 10/2002 | Chevance et al. | 375/240.16 |
| 6,658,059 B1 | 12/2003 | Iu et al. | |
| 6,744,916 B1 | 6/2004 | Takahashi | |
| 6,842,483 B1 * | 1/2005 | Au et al. | 375/240.16 |
| 7,170,562 B2 | 1/2007 | Yoo et al. | |
| 7,187,810 B2 * | 3/2007 | Clune et al. | 382/294 |
| 7,206,002 B2 | 4/2007 | Kawamoto | |
| 7,260,148 B2 | 8/2007 | Sohm | |
| 7,457,435 B2 * | 11/2008 | Pace | 382/103 |
| 7,565,019 B2 | 7/2009 | Dong et al. | |
| 7,606,424 B2 * | 10/2009 | Rohaly | 382/209 |
| 7,697,724 B1 | 4/2010 | Gao et al. | |
| 7,751,482 B1 * | 7/2010 | Srinivasan et al. | 375/240.16 |
| 7,801,218 B2 * | 9/2010 | Olivier et al. | 375/240.16 |
| 7,860,160 B2 | 12/2010 | Shimazaki et al. | |
| 8,368,774 B2 * | 2/2013 | Grycewicz | 348/222.1 |
| 2003/0053542 A1 | 3/2003 | Seok | |
| 2003/0152279 A1 * | 8/2003 | Ohtani et al. | 382/236 |
| 2003/0189981 A1 | 10/2003 | Lee | |
| 2004/0070686 A1 | 4/2004 | Jung et al. | |
| 2004/0075749 A1 * | 4/2004 | Kondo et al. | 348/222.1 |
| 2004/0114688 A1 | 6/2004 | Kang | |
| 2004/0247029 A1 | 12/2004 | Zhong et al. | |
| 2005/0094852 A1 | 5/2005 | Kumar et al. | 382/107 |
| 2005/0094899 A1 | 5/2005 | Kim et al. | |
| 2005/0100235 A1 | 5/2005 | Kong et al. | |
| 2005/0134745 A1 | 6/2005 | Bacche et al. | |
| 2005/0190844 A1 | 9/2005 | Kadono et al. | |
| 2005/0201626 A1 | 9/2005 | Kang et al. | |
| 2006/0023119 A1 | 2/2006 | Han | |
| 2006/0050795 A1 | 3/2006 | Boroczky et al. | |
| 2006/0083407 A1 | 4/2006 | Zimmermann et al. | 382/107 |
| 2006/0110062 A1 | 5/2006 | Chiang et al. | |
| 2006/0139376 A1 | 6/2006 | Le Dinh et al. | |
| 2007/0009038 A1 | 1/2007 | Kim et al. | |
| 2007/0047652 A1 | 3/2007 | Maruyama et al. | |
| 2007/0189385 A1 * | 8/2007 | Park et al. | 375/240.12 |
| 2007/0189637 A1 * | 8/2007 | Rohaly | 382/278 |
| 2007/0195881 A1 | 8/2007 | Hagiya | |
| 2008/0002774 A1 | 1/2008 | Hoshino et al. | |
| 2008/0025403 A1 | 1/2008 | Sato | |
| 2008/0037647 A1 | 2/2008 | Stojancic et al. | |
| 2008/0123743 A1 | 5/2008 | Douniwa et al. | |
| 2008/0219348 A1 | 9/2008 | Sugimoto et al. | |

FOREIGN PATENT DOCUMENTS

| | | | |
|---|---|---|---|
| WO | WO 92/19068 | 10/1992 | H04N 5/14 |
| WO | WO 95/24096 | 9/1995 | H04N 5/14 |
| WO | 2006/089557 A1 | 8/2006 | |

OTHER PUBLICATIONS

Sanjeev Kumar et al., "Global Motion Estimation in Frequency and Spatial Domain" Department of Electrical and Computer Engineering, UCSD, La Jolla, California.

Loy Hui Chein et al., "Robust Motion Estimation for Video Sequences Based on Phase-Only Correlation" Graduate School of Information Sciences, Tohoku University, Japan, Signal and Image Processing Aug. 23-25, 2004, Honolulu, Hawaii, USA pp. 441-446.

T. Vlachos, "Simple method for estimation of global motion parameters using sparse translation motion vector fields", Electronics Letters Jan. 8, 1998 vol. 34 No. 1.

Su et al., "Robust Global Motion Estimation From Coarsely Sampled Motion Vector Fields"; Image and Video Communications and Processing 2003, Published Jun. 30, 2003, pp. 98-101, vol. 5022, Proceedings of SPIE-IS&T Electronic Imaging.

Hao-Song Kong et al., "Edge Map Guided Adaptive Post-Filter for Blocking and Ringing Artifacts Removal", IEEE International Symposium on Circuits and Systems (ISCAS), vol. 3, p. 929-932, May 2004( IEEE Xplore).

L.Atzori, et al., "Low-Complexity Post-Processing for Artifact Reduction in Block-DCT Based Video Coding", Image Process, 2000, Proceedings 2000 International Conference on vol. 2, pp. 668-671, Feb. 2000.

H. Huu et al, "Simultaneous Coding Artifact Reduction and Sharpness Enhancement", Consumer Electronics, 2007, ICCR 2007, Jan. 2007, pp. 1-2.

Ling Shao et al., "Integrated Image enhancement and Artifacts Reduction Based on Frequency Bands Manipulation", Jul. 2007, pp. 292-295, Multimedia and Expo, 2007 IEEE International Conference.

Thomas Meier et al., "Reduction of Blocking Artifacts in Image and Video Coding", Apr. 1999, pp. 490-500, Circuits and Systems for Video Technology, IEEE Transactions on vol. 9, Issue 3.

Tai-Wai Chang et al., "A Novel Content-Adaptive Interpolation", 2005, pp. 6260-6263, Department of Electrical and Electronic Engineering, Hong Kong University of Science and Technology, Hong Kong.

Lei Zhang et al., "An Edge-Guided Image Interpolation Algorithm via Directional Filtering and Data Fusion", Aug. 2006, vol. 15, No. 8, pp. 2226-2238, IEEE Transactions on Image Processing.

Yang et al., "On Incorporating Just-Noticeable-Distrotion Progile Into Motion-Compensated Prediction for Video", Image Processing, 2003, ICIP2003, International Conference, vol. 3, pp. III-833-6 vol. 2, Sep. 14-17, 2003.

Dufaux, F., and Konrad, J., "Efficient, Robust, and Fast Global Motion Estimation for Video Coding" IEEE Transactions on Image Processing, vol. 9, No. 3, Mar. 2000, pp. 497-501.

* cited by examiner

MPE Motion Estimation

Block Diagram of Local ME

Extended Block FFT

Variable Block-size Search

Temporal Tracking $v_b$ = best matched MV between Pic $n$ and $n-1$ $v_t$ = median $(v_1, \ldots, v_k, \mu_v)$ $v_k$    motion vectors associated with the covered area where $\mu_v$    mean of $v_k$,   $k = 1 \ldots K$ $K$    4 for 4X4 block and 16 for 8X8 block ⇧   Final motion vector $v = \arg\min_{v_t, v_b} J$ Bi-directional ME

MOTION PARAMETER ENGINE FOR TRUE MOTION

FIELD OF THE INVENTION

The present invention relates to the field of video motion estimation. More specifically, the present invention relates to video motion estimation using a motion parameter engine.

BACKGROUND OF THE INVENTION

In the digital era, many personal content videos have been transferred to a digital format for storage. There is a strong need to improve picture quality in these videos. Information of temporal relations (motion information) between video frames plays a very important role for such a quality improving process. However, existing algorithms for motion information focus mainly on video compression instead of true motion between pictures. In video compression, the true motion is not a concern, the goal is to find the closest picture data to the original; essentially, which area should be selected to be compared to provide the best compression.

Motion compensated coding is used for moving pictures such as HDTV broadcasting systems and standardized schemes of the Moving Picture Experts Group (MPEG). Motion estimation methods used in motion-compensated coding include a pel-recursive algorithm and a block matching algorithm. Although a pel-recursive algorithm tends to be more precise, block matching is widely used for moving image systems in view of real-time processing and simplified circuit implementation. In using the block matching algorithm, an image is partitioned into blocks having a constant size such as 16 pixels×16 pixels and then a motion vector for each block is obtained using a minimum absolute error.

Another known motion estimation technique uses phase correlation. The aim of the phase correlation process is to measure the movement of objects between two scenes by measuring the correlation of the pixels in the current block against the pixels in the delayed reference block. Where there is simple movement within the block, the correlation will be good, and there will be a peak in the correlation surface.

Currently, the existing motion search algorithms are directly applied for video compression to improve quality which is not very effective. Other times an optical flow approach is utilized which requires too much computational power for practical use. In the optical flow approach, every pixel in the image and the motion of each pixel is used. This approach is extremely complex and requires a huge amount of computation.

SUMMARY OF THE INVENTION

Local motion estimation is described herein. Each picture of a video is partitioned into blocks for the local motion estimation. An extended-block FFT is calculated for each block, where the extended-block denotes that a certain area around the block is also included for applying FFT. Extending the block for FFT helps to account for the motion of objects that are moving into or out of the block. Phase correlation is applied to attain a set of Motion Vector (MV) candidates for the blocks, and a cost function is evaluated for each MV. If no MV candidate produces a cost function below a pre-defined threshold, a hierarchical variable block matching search is applied and the process is repeated with blocks for finer resolution. Also, predictive MV candidates are used during the block matching search along with temporal constraints tracking to select an MV that yields the minimum cost function.

In one aspect, a method of estimating local motion in a video comprises phase correlating a first extended block and a second extended block to determine one or more motion vector candidates, implementing a variable block search using the one or more motion vector candidates to determine a best motion vector, wherein the best motion vector has a minimal cost function and implementing a predictive motion vector search to ensure the best motion vector represents true motion. Implementing a variable block search comprises splitting a target block into a set of 8 pixel×8 pixel blocks, performing an 8 pixel×8 pixel block search, performing a 4 pixel×4 pixel block search, if the 8 pixel×8 pixel block search does not determine the best motion vector and performing a 2 pixel×2 pixel block search, if the 4 pixel×4 pixel block search does not determine the best motion vector. Estimating local motion is bi-directional. The method further comprises partitioning a picture of a video into a plurality of blocks. The first extended block corresponds to a reference block and the second extended block corresponds to a current block, further wherein the reference block and the current block are co-located. Fast Fourier Transforms are carried out on the first extended block and the second extended block. The method further comprises implementing temporal tracking to determine whether the best motion vector is in motion.

In another aspect, a method of estimating local motion in a video comprises determining motion in the video to be local motion, phase correlating a first extended block and a second extended block to determine one or more motion vector candidates, wherein the first extended block corresponds to a reference block from a previous frame and the second extended block corresponds to a current block from a current frame, refining the one or more motion vector candidates, implementing a variable block search using the one or more motion vector candidates to determine a best motion vector, wherein the best motion vector has a minimal cost function, implementing a predictive motion vector search to ensure the best motion represents true motion, temporally tracking to determine whether the best motion vector is in motion and refining the best motion vector. Implementing a variable block search comprises splitting a target block into a set of 8 pixel×8 pixel blocks, performing an 8 pixel×8 pixel block search, performing a 4 pixel×4 pixel block search, if the 8 pixel×8 pixel block search does not determine the best motion vector and performing a 2 pixel×2 pixel block search, if the 4 pixel×4 pixel block search does not determine the best motion vector. Local motion estimating is bi-directional. The method further comprises partitioning a picture of a video into a plurality of blocks. The first extended block corresponds to a reference block and the second extended block corresponds to a current block, and wherein the reference block and the current block are co-located. Fast Fourier Transforms are carried out on the first extended block and the second extended block.

In yet another aspect, a method of searching for a best motion vector with a variable block size comprises splitting a target block into a set of 8 pixel×8 pixel blocks, performing an 8 pixel×8 pixel block search, performing a 4 pixel×4 pixel block search, if the 8 pixel×8 pixel block search does not determine the best motion vector and performing a 2 pixel×2 pixel block search, if the 4 pixel×4 pixel block search does not determine the best motion vector. The method further comprises implementing a predictive motion vector search when necessary.

In another aspect, an apparatus for acquiring video and estimating local motion within the video, comprises an application for phase correlating a first extended block and a second extended block to determine one or more motion vector candidates, implementing a variable block search using the one or more motion vector candidates to determine a best motion vector, wherein the best motion vector has a minimal cost function and implementing a predictive motion vector search to ensure the best motion vector represents true motion, a processor for executing the application and a memory coupled to the processor for temporarily storing data for execution by the processor. Estimating local motion is bi-directional. The application is further for partitioning a picture of a video into a plurality of blocks. The first extended block corresponds to a reference block and the second extended block corresponds to a current block, further wherein the reference block and the current block are co-located. Fast Fourier Transforms are carried out on the first extended block and the second extended block. The application is further for implementing temporal tracking to determine whether the best motion vector describes true motion.

In yet another aspect, a method of estimating local motion in a video for each target block comprises generating an extended block for phase correlation calculation, determining motion vector candidates, splitting each target block into 8×8 blocks and finding an associated motion vector from the motion vector candidates and applying a variable block search if the associated motion vector is not found. The target block is 32 pixels by 32 pixels and the extended block is 64 pixels by 64 pixels. Implementing a variable block search comprises performing an 8 pixel×8 pixel block search, performing a 4 pixel×4 pixel block search, if the 8 pixel×8 pixel block search does not determine the best motion vector and performing a 2 pixel×2 pixel block search, if the 4 pixel×4 pixel block search does not determine the best motion vector.

DETAILED DESCRIPTION OF THE PREFERRED EMBODIMENT

When estimating video motion, there are two different kinds of motion: global motion and local motion. Global motion exists when acquiring video and the entire (global) video moves, such as when a user's hand shakes or when the user pans the video camera. Local motion on the other hand is when an object within an entire scene moves, such as a dog running in a park while the background of the grass and trees is relatively stationary.

The motion parameter engine determines the true local motion in a video while minimizing the complexity of doing so. By using an extended block Fast Fourier Transform (FFT) in conjunction with phase correlation, variable block searching, predictive motion vector searching and temporal tracking, the motion parameter engine is able to perform true motion estimation with minimal computation costs. The motion parameter engine focuses on objects and not pixels which also helps minimize the complexity.

In video standards such as MPEG, the current picture is described from a previous picture, and each picture is divided into blocks for computation. In the motion parameter engine, a slightly larger block than a regular MPEG block is used. FFTs are carried out on the blocks. Phase correlation is then used to find motion vector candidates since there are likely several objects in motion in each block. Using phase correlation, peaks signify possible candidate motion vectors. Sub-pel refinement is applied to the pool of local motion vector candidates determined from phase correlation. Then, a variable block search is applied. The variable block search hierarchically determines the best motion vector. A predictive motion vector search is used with the variable block search to ensure that a matching block is following the smooth and true motion. Temporal tracking ensures that the process does not stay within a local minimum. Additional sub-pel refinement is utilized, and motion flow is able to be determined without using optical flow.

Unlike conventional motion estimators, the motion parameter engine is able to provide translation, scaling and rotation whereas conventional motion estimators only provide translation.

Figure 1:
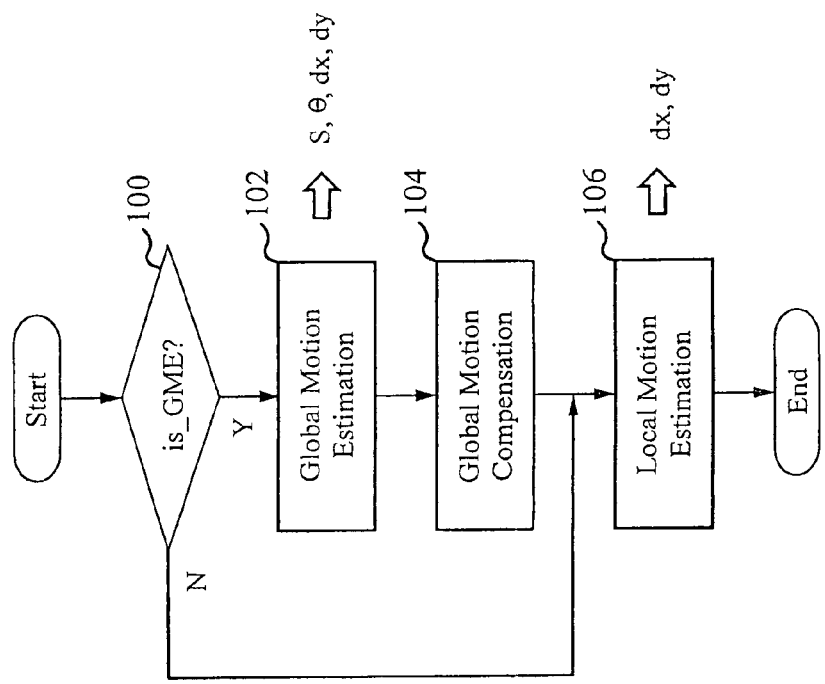
FIG. 1 illustrates a flowchart of a process for determining motion estimation.

FIG. 1 illustrates a flowchart of a process for determining motion estimation. In the step 100, it is determined if the motion is global motion estimation or local motion estimation. If there is no global motion estimation in the step 100, then the process jumps to local motion estimation in the step 106. If there is global motion estimation in the step 100, then global motion estimation is performed in the step 102. Thereafter, global motion compensation is handled in the step 104. Then, any local motion estimation is performed in the step 106.

Figure 2:
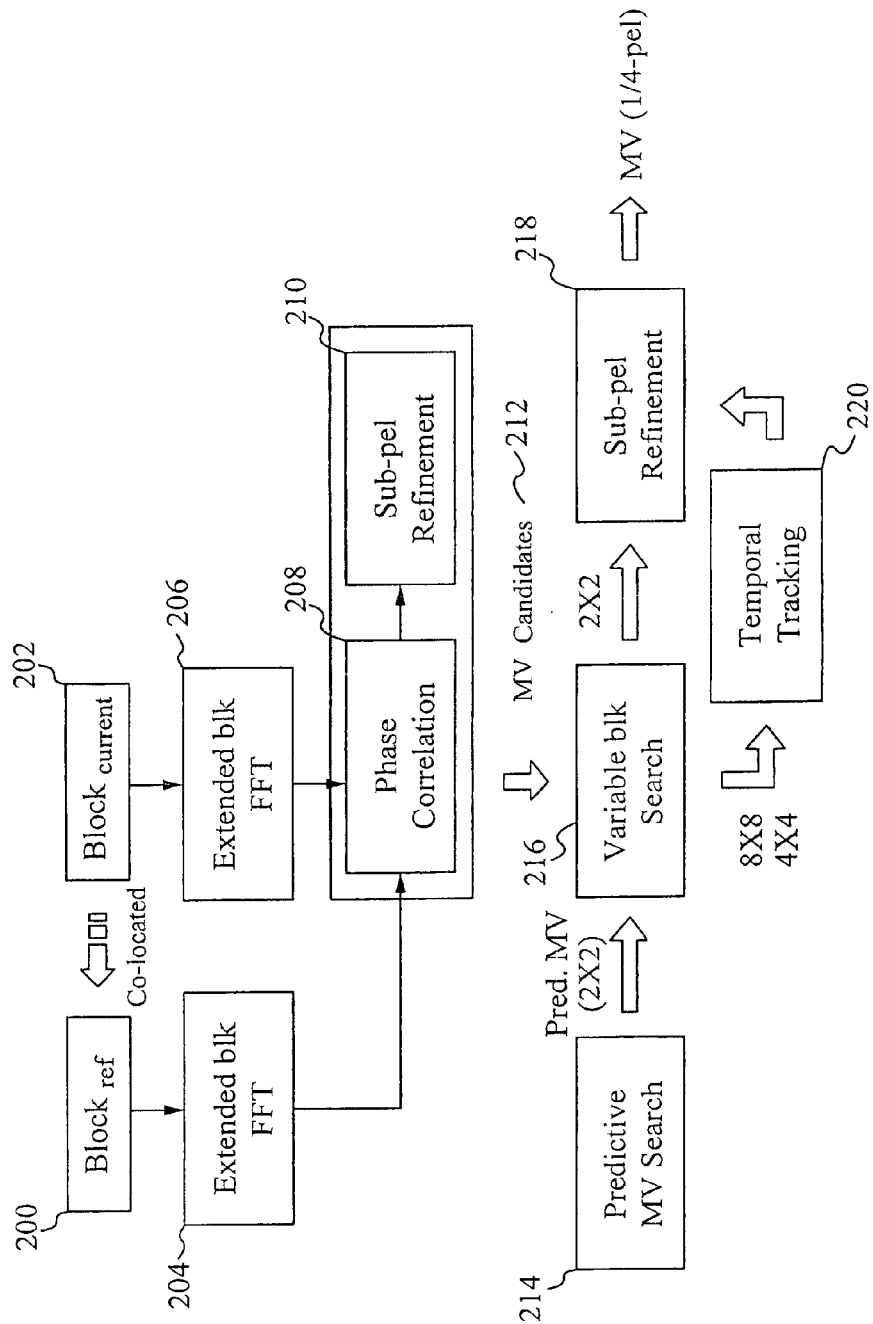
FIG. 2 illustrates a block diagram of local motion estimation.

FIG. 2 illustrates a block diagram of local motion estimation.

In general, local motion estimation for each target block (32 pixels×32 pixels) includes generating an extended block (e.g. 64 pixels×64 pixels) for phase correlation calculation. Then motion vector candidates are determined. From there, the target block is split into smaller blocks (e.g. 8 pixels×8 pixels) and the associated motion vector from the motion vector candidates is found. If there is not an adequate match, a variable block search is applied.

More specifically, the motion estimation algorithm includes two stages: a Phase-Plane Peak Location Collection Stage and a Candidate Motion Vector Matching Stage. The first stage includes the following steps. The frames $I_k$ and $I_{k-1}$ are divided into current large blocks $LB_k(i,j)$ 202 and reference blocks $LB_{k-1}(i,j)$ 200, each of size 32 pixels×32 pixels or 16 pixels×16 pixels. The large blocks $LB_k(i,j)$ 202 and $LB_{k-1}(i,j)$ 200 are extended to extended blocks $EB_k(i,j)$ 206 and $EB_{k-1}(i,j)$ 204, each of size 64 pixels by 64 pixels. The FFT is computed of the windowed extended blocks $EB_k(i,j)$ 206 and $EB_{k-1}(ij)$ 204 using the raised cosine window to get $FB_k(i,j)$ and $FB_{k-1}(ij)$. The raised cosine windowing function is given by:

$$W(a, k, L) = a + (1-a)\cos\left(\left(k - \frac{L-1}{2}\pi\right) / (L-1)\right), k = 0, 1, \ldots, L,$$

with $0<\alpha<1$ to control how much to raises the window level.

The normalized phase-correlation function is computed:

$$P = \mathcal{F}^{-1}\left(\frac{FB_{k-1} \cdot FB_k^*}{|FB_{k-1} \cdot FB_k^*|}\right).$$

where $\mathcal{F}^{-1}$ denotes the inverse FFT, and * denotes the complex conjugate.

Phase correlation 208 and sub-pel refinement 210 are used to determine motion vector candidates 212. The phase correlation function P is compared to a threshold, and the first N largest peaks of the normalized phase correlation function, peak[k] (k=0, 1, 2, ..., N) (in decreasing order) with location (px[k], py[k]) (k=0, 1, 2, ..., N), respectively.

The sub-pel peak locations are estimated as follows:

```
if (peak_1*peak_r >0 ){
    if (peak_1*peak > 0){
        f = P(peak, peak_1) - P(peak, peak_r);
        *px = *px - f;
    }else{
        *px = *px;
    }
}else if (peak_1*peak > 0){
    f = P(peak, peak_1);
    *px = *px - f;
}else if (peak_r*peak > 0){
    f = P(peak, peak_r);
    *px = *px + f;
}else{
    *px = *px;
}
``` where peak_1 and peak_r are phase plan values at px−1 and px+1, respectively; and $P(c_1,c_2)$ is an interpolation polynomial. For linear interpolation, $P(c_1, c_2)=x$, where $x=\min(c_1, c_2)/\max(c_1,c_2)+\min(c_1,c_2)$. For $5^{th}$ polynomial interpolation, $P(c_1, c_2)=a_0 x^5 + a_1 x^4 + a_2 x^3 + a_3 x^2 + a_4 x$.

The sub-pel peak locations are quantized into ¼-pel by sub-pel refinement 210, and the quantized peak locations of all large blocks are buffered.

The second stage, also referred to as the candidate motion vector matching stage includes the following steps. The reference frame is interpolated to generate the ¼-pel resolution reference. The ½-pixel values are generated using a 6-tap interpolation filter. The ¼-pixel values are generated using bi-linear interpolation. For each large block, candidate peak motion vectors are selected. The candidate peak motion vectors include all the peak locations of the concerned large block and of its 8 neighboring large blocks. A variable block search 216 is used with a predictive motion vector search 214 to determine the best matching motion vector. For each 8 pixel×8 pixel block inside the concerned large block, the candidate peak motion vectors are searched for the best matching motion vector by using the cost function:

$$J_B(f, f_r, \vec{v}, \vec{v}_p) = \min SAD_B(f, f_r, \vec{v}) + \alpha \|\vec{v} - \vec{v}_p\| + \beta \|\vec{v}\|$$

with α and β controlling the weightings, and β is a constant multiplied by the associated block size, where the SAD is computed using the color component, $\vec{v}$ is the motion vector to be searched for, and $\vec{v}_p$ is the best matched spatial-temporal predictive motion vector. In the cases of 8 pixels×8 pixels or 4 pixels×4 pixels, $\vec{v}_p=0$. The cost function is computed for both the 8 pixel×8 pixel block and its four 4 pixel×4 pixel sub-blocks.

Temporal tracking 220 prevents the process from being trapped at a local minimum. The temporal tracking motion vector is found by locating the best matched 8 pixel×8 pixel block in the previous frame, and then its 16 2 pixel×2 pixel motion vectors and their mean vector are used to compute the median vector. The temporal tracking motion vector and the best matching motion vector from the cost function are compared to get a better match. For this matched 8 pixel×8 pixel block, the flatness of the J-difference block is checked by comparing the relative difference between the maximal and the minimal J-difference 4 pixel×4 pixel blocks. If the cost function of the matched 8 pixel×8 pixel block is less then a threshold $\tau_{8\times 8}$, and the 8 pixel×8 pixel J-difference block is flat, then the motion vector is accepted as the best motion vector for this 8 pixel×8 pixel block and the motion error level for this block is assigned to 0 (e.g. reliable). Otherwise, the 8 pixel×8 pixel block is split into four 4 pixel×4 pixel blocks. The steps starting with searching among the candidate peak motion vectors for a best matching motion vector through checking the flatness of the J-difference block are repeated for each 4 pixel×4 pixel block split from the 8 pixel×8 pixel block. However, the threshold $\tau_{4\times 4}$ is used for 4 pixel×4 pixel blocks. If the cost function of the matched 4 pixel×4 pixel block is less than the threshold $\tau_{4\times 4}$, and the 4 pixel×4 pixel J-difference block is flat, then the motion vector is accepted as the best motion vector for this 4 pixel×4 pixel block and the motion error level for this block is assigned to 0. Otherwise, the 4 pixel×4 pixel block is split into four 2 pixel×2 pixel blocks. For each 2 pixel×2 pixel block split from 4 pixel×4 pixel blocks, a predictive motion vector search is done to get the best matched predictive motion vector $\vec{v}_p$. The candidate predictive motion vectors include the zero motion vector, the motion vector of the temporal collocated 2 pixel×2 pixel block of the previous frame, and the motion vectors of the spatial-temporal neighboring 2 pixel×2 pixel blocks. The cost function has the same form as above, but with α=0 and a smaller β value. After the predictive motion vector search, the peak motion vector matching is done using the candidate peak motion vectors and the best matched predictive motion vector $\vec{v}_p$. The cost function has the same form as above, but with α≠0 and a different β value.

Using a refinement search 218, or a gradient descent search, the 8 immediate neighboring pixel positions are searched. If there is no better match, then the search terminates. If there is a better match, the center position is moved to the newly matched position, and the procedure is repeated. The total search step is 4 for a ¼-pel motion vector. The search is based on SAD.

Then, the minimal SAD is quantized to four levels: 0, 1, 2 and 3 and saved as the motion error level for the current 2 pixel×2 pixel block. 0 is reliable, while 3 is not reliable. The four quantization intervals, which correspond to the four levels, are [0, 5), [5, 10), [10, 15) and [15, +∞).

Furthermore, each of the components shown in FIG. 2 is able to correlate to a hardware implementation for carrying out processes such as phase correlation, sub-pel refinement, predictive motion vector searching, variable block searching and temporal tracking.

Each of the aspects of the motion parameter engine are described in further detail below.

Figure 3:
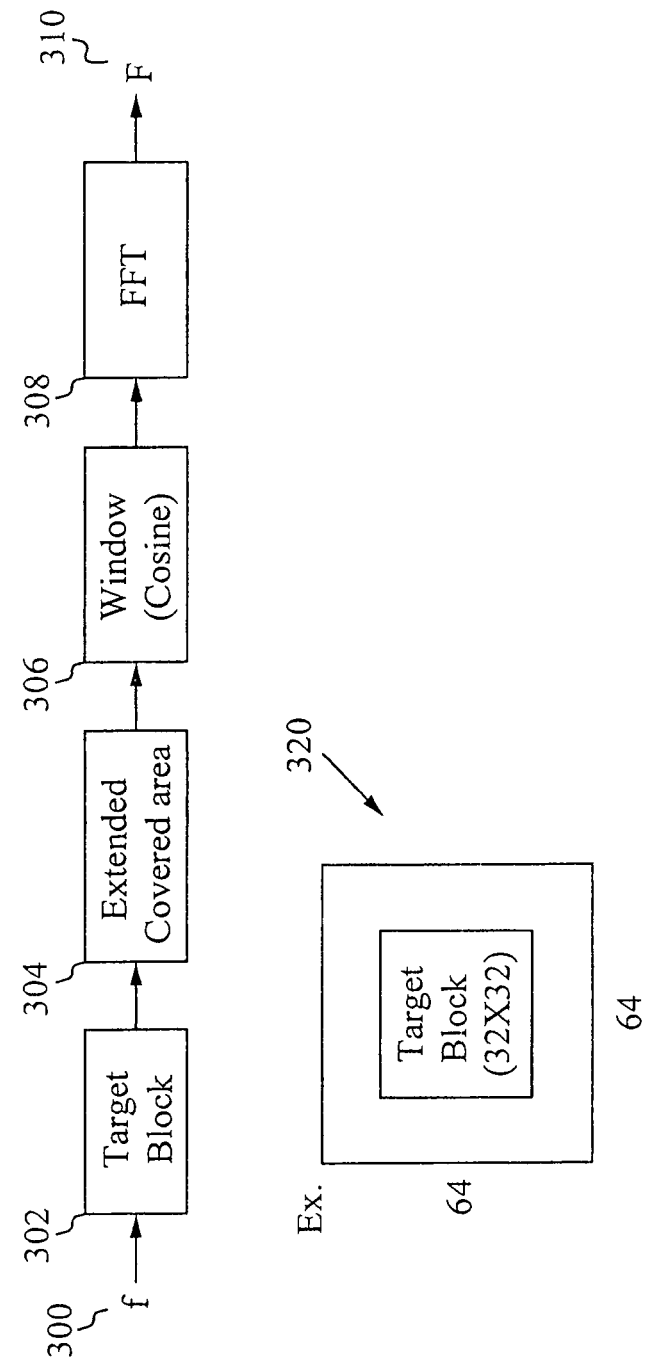
FIG. 3 illustrates a block diagram of an extended block FFT process.

FIG. 3 illustrates a block diagram of an extended block FFT process. To produce an extended block FFT, data of the current picture (f) 300 is acquired. Then, a target block 302 from the current picture (f) 300 is selected. An extended covered area 304 around the target block 302 is determined. Then, the cosine of the window 306 is taken. An FFT 308 is used to produce a transformed version of the extended covered area (F) 310. As shown in the example 320, if a target block is 32 pixels×32 pixels, an extended area could be 64 pixels×64 pixels. However, an extended block of size 64 pixels×64 pixels is merely an example and should not limit the invention in any way. The extended block is able to be any appropriate size.

Figure 4:
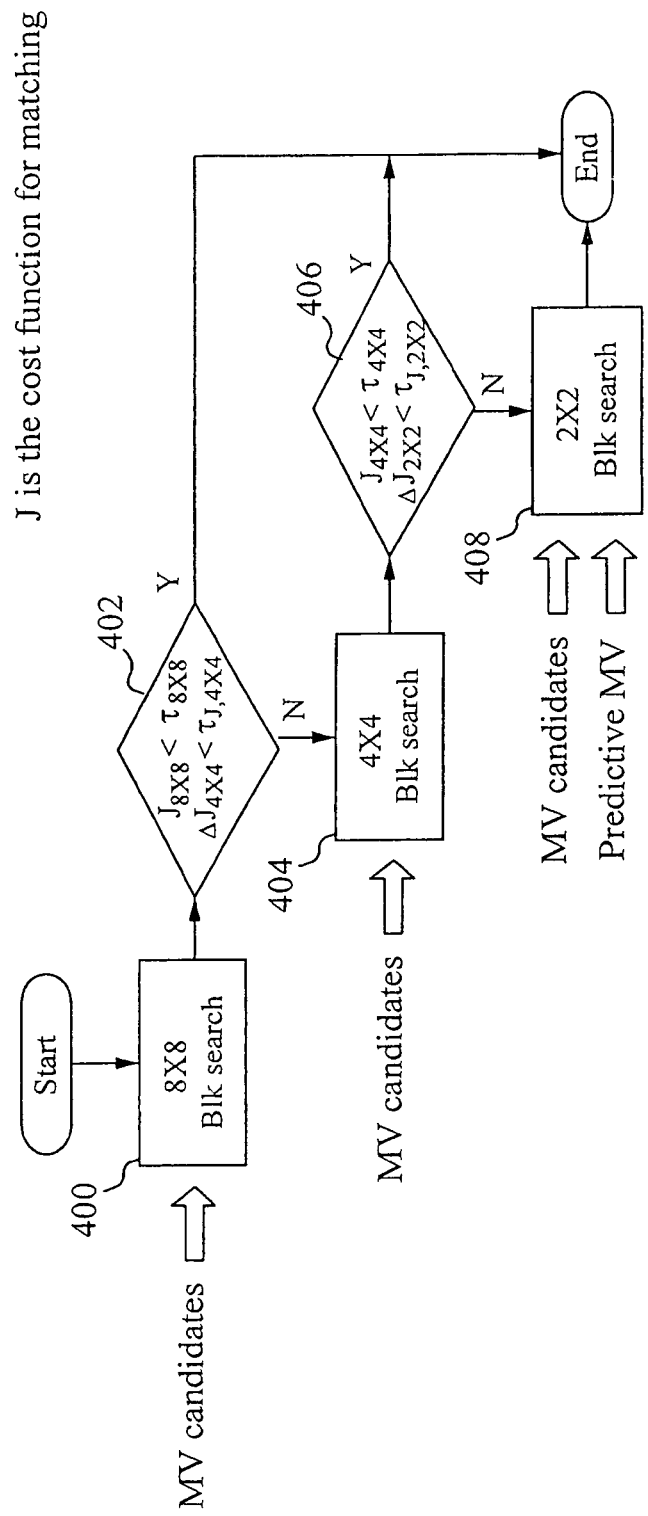
FIG. 4 illustrates a flowchart of a process for using a variable block-sized search.

FIG. 4 illustrates a flowchart of a process for using a variable block-sized search to determine a best motion vector. When working with a 64 pixel×64 pixel extended block, the target block is 32 pixels×32 pixels. To determine the appropriate motion, this target block is further split into 16 8 pixel×8 pixel blocks. In the step 400, an 8 pixel×8 pixel block search is performed based on the motion vector candidates. If the best motion vector of the motion vector candidates has a cost function $J_{8\times8}$ such as a distortion error smaller than a threshold ($\tau_{8\times8}$) and the differences of $J_{4\times4}$ between 4 pixel×4 pixel sub-blocks are smaller than a threshold ($\tau_{J,\,4\times4}$) in the step 402, then there is a good match and further searching is unneeded. If the error is larger than the threshold or the difference of $J_{4\times4}$ is larger than a threshold ($\tau_{J,\,4\times4}$) in the step 402, then the block is broken down into smaller blocks, so that a 4 pixel×4 pixel block search is performed based on the motion vector candidates in the step 404. If the best motion vector there has a distortion error $J_{4\times4}$ smaller than a threshold ($\tau_{4\times4}$) and the $J_{2\times2}$ differences between associated 2 pixel×2 pixel sub-blocks are smaller than a threshold ($\tau_{J,\,2\times2}$) in the step 406, then the match is sufficient and the process ends. If there is not a sufficient match in the step 406, then in the step 408, a 2 pixel×2 pixel block search is performed using the motion vector candidates and a predictive motion vector. The predictive motion vector helps ensure that the true motion is found, not simply the best match. This is done since the size of the block is so small, it is possible that the best match is not representing true motion.

Figure 5:
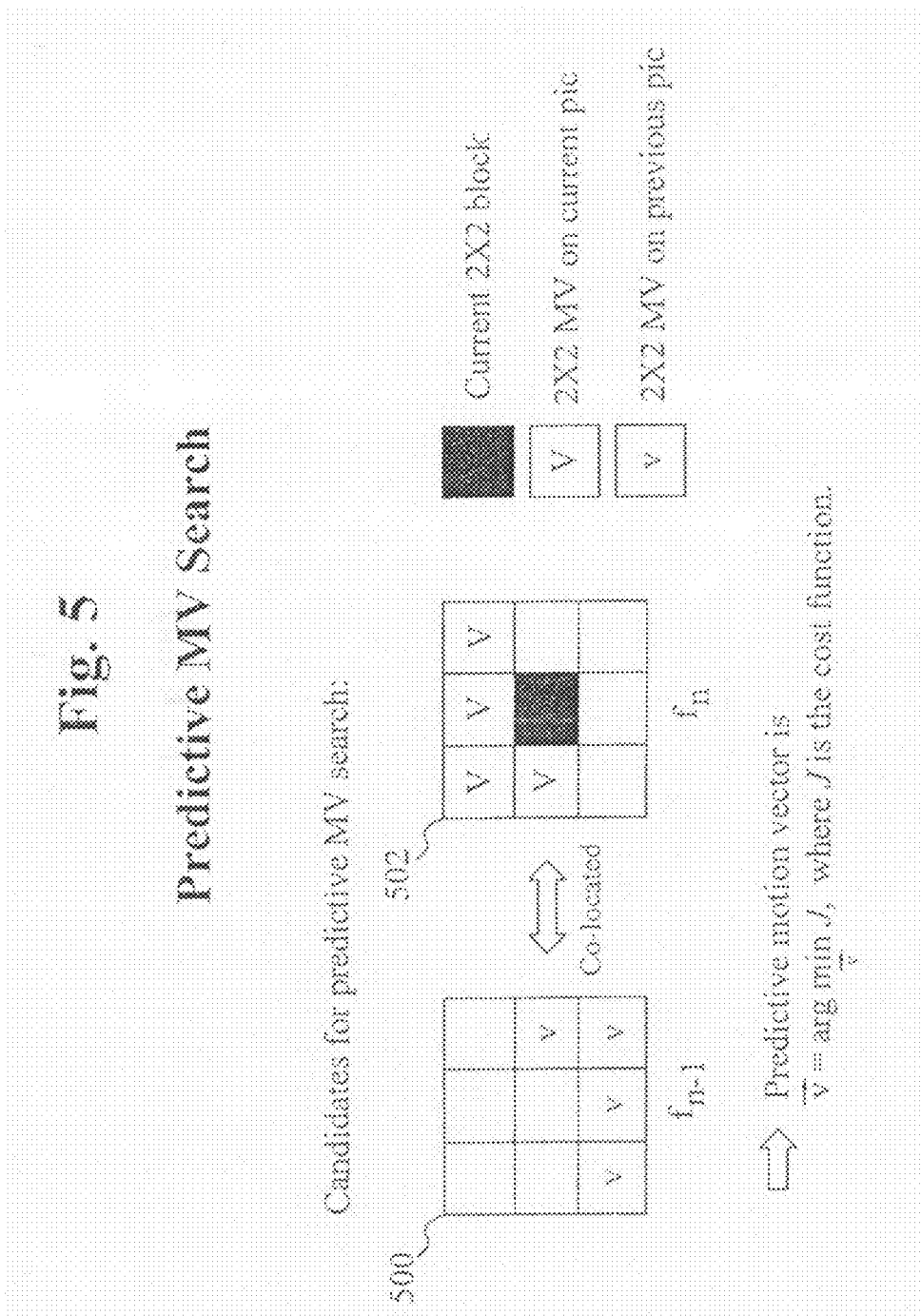
FIG. 5 illustrates a graphical representation of candidates for a predictive motion vector search.

FIG. 5 illustrates a graphical representation of candidates for a predictive motion vector search. A previous co-located block 500 includes motion vectors which are able to be used as motion vector candidates for the current block 502. Roughly half of the motion vectors are from the previous picture and roughly half of the motion vectors are from the current picture. The predictive motion vector is then able to be determined as $$\vec{v} = \operatorname*{argmin}_{\vec{v}} J,$$

where J is the cost function in terms of the motion vector. This finds the predictive motion vector.

Figure 6:
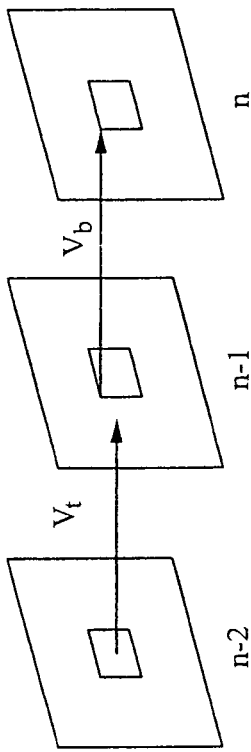
FIG. 6 illustrates a graphical representation of temporal tracking.

The cost function J with spatiotemporal tracking is applied for the block search. This cost function is designed to balance the best SAD match with smooth temporal motion vector field flow. Not only luminance information but also chrominance information is used for SAD calculation. The block matching problem becomes:

$$\min_{\vec{v}} \; J = \operatorname{SAD}(f(\vec{x}),\, f_{ref}(\vec{x}+\vec{v})) + \alpha\|\vec{v}-\vec{v}_{pred}\|_1 + \beta\|\vec{v}\|_1$$

where:
SAD Sum of Absolute Difference on luma and chroma
$f$ data of current picture
$f_{ref}$ data of reference picture
$\vec{v}$ candidate motion vector
$\vec{v}_{pred}$ the best matched predictive motion vector FIG. 6 illustrates a graphical representation of temporal tracking as used within the motion parameter engine. Since temporal constraints where not applied on 8 pixel×8 pixel block matching and 4 pixel×4 pixel block matching during the variable block size search, a temporal tracking is added.

When a bigger block, such as an 8 pixel×8 pixel or 4 pixel×4 pixel block already achieves a good match, it is able to be treated as an object or part of an object with the same motion. Therefore, the motion vector of this "object" is able to be traced back on the previous picture as a reference for comparison.

Since motion vectors are kept for each 2×2 block, there are corresponding 16 motion vectors on an 8 pixel×8 pixel block or 4 motion vectors on a 4 pixel×4 pixel block. A median filtering is applied on these motion vectors with their mean value to determine a representative motion vector ($V_t$) of this "object" on a previous time frame. The motion vector ($V_b$ or $V_1$) that has the minimum cost function is the final motion vector.

Temporal tracking helps to avoid being trapped in a local minimum. Temporal tracking tracks a block over multiple frames to determine where the block came from to determine whether the possible motion flow. The value $v_b$ equals the best matched motion vector between picture n and n−1. The value $v_t$ equals the median of ($v_1$ through $v_k, \mu_v$) where:
$v_k$ is the motion vector associated with the covered area;
$\mu_v$ is the mean of $v_k$, k=1. . . K; and
K is 4 for a 4×4 block and 16 for an 8×8 block.
Thus, the final motion vector is $$v = \operatorname*{arg\,min}_{v_t, v_k} J.$$

Figure 7:
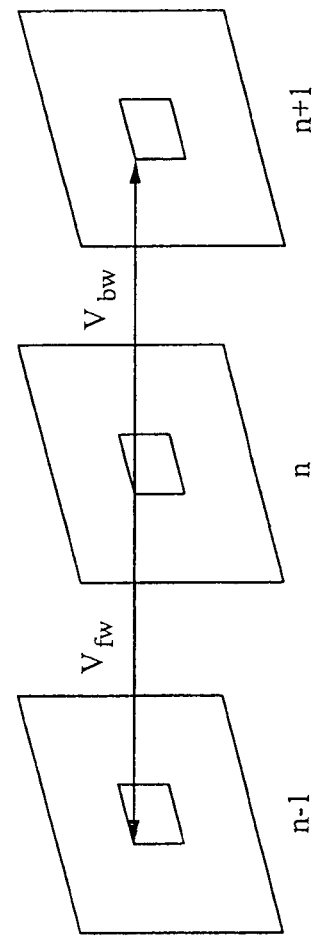
FIG. 7 illustrates a graphical representation of bi-directional motion estimation.

FIG. 7 illustrates a graphical representation of bi-directional motion estimation. Bi-directional motion estimation is useful for instances when something is blocked and then exposed. Bi-directional motion estimation better handles un-occluded areas and utilizes both forward and backward motion vectors.

The bi-directional motion estimation includes forward motion estimation and backward motion estimation. The backward motion estimation is similar to the forward motion estimation but uses the next frame as the reference frame instead of the previous frame. The bi-directional motion estimation is done large block by large block so that the block FFT for the current frame only needs to be computed once.

Multi-frame motion estimation is done by first estimating the bi-directional motion vector fields for the closest reference frame pair, then for the next closest reference frame pair, and so on. For each reference frame pair, the corresponding motion vector fields are stored in a motion vector frame.

Figure 8:
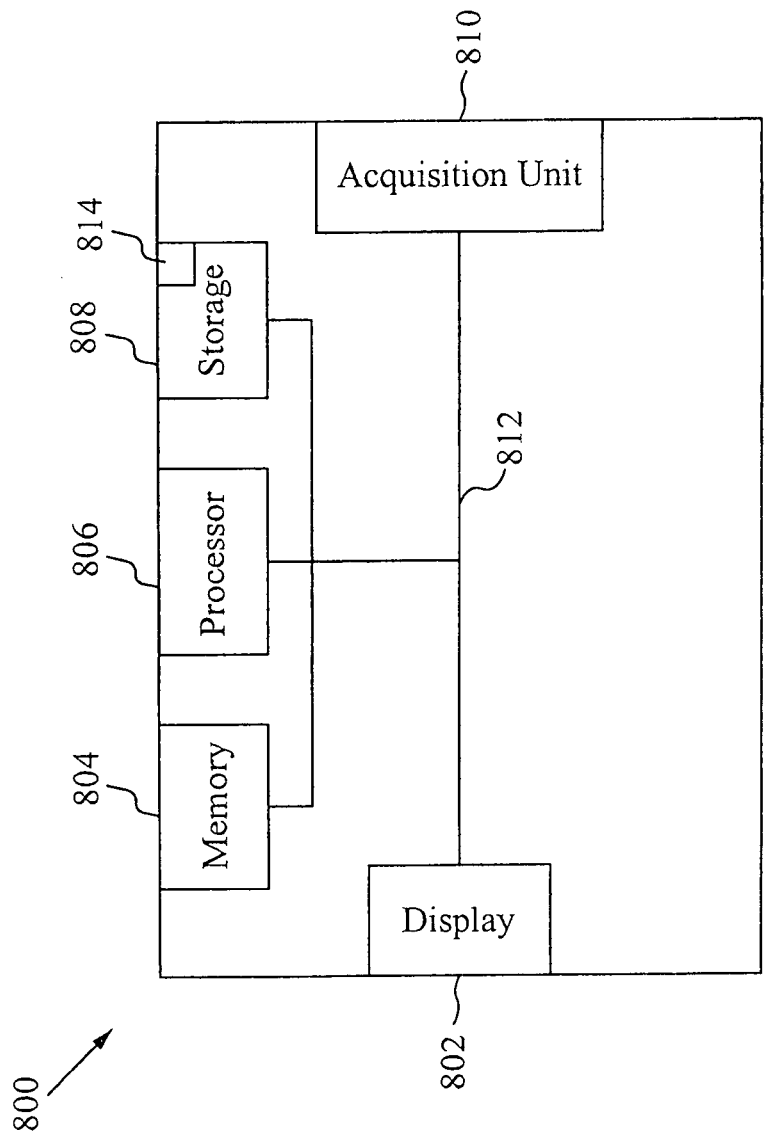
FIG. 8 illustrates a graphical representation of a computing device implementing local motion estimation.

FIG. 8 illustrates a graphical representation of a computing device implementing local motion estimation utilizing the motion parameter engine. A computing device 800 includes a number of elements: a display 802, a memory 804, a processor 806, a storage 808, an acquisition unit 810 and a bus 812 to couple the elements together. The acquisition unit 810 acquires video data which is then processed by the processor 806 and temporarily stored on the memory 804 and more permanently on the storage 808. The display 802 displays the video data acquired either during acquisition or when utilizing a playback feature. When the local motion estimation described herein is implemented in software, an application 814 resides on the storage 808, and the processor 806 processes the necessary data while the amount of the memory 804 used is minimized. When implemented in hardware, additional components are utilized to process the data, as described above. The computing device 800 is able to be, but is not limited to, a home server, a digital camcorder, a digital camera, a cellular phone, PDA or a computer.

To utilize the motion parameter engine, a user does not perform any additional functions. The motion parameter engine automatically improves the motion estimation of a video so that the user more efficiently experiences the video. The motion parameter engine is utilized by taking an extended block FFT of a current block and a co-located reference block. The extended blocks are phase correlated and then sub-pel refined to determine motion vector candidates. Using a variable block search and a predictive motion vector search when necessary, along with temporal tracking and an additional sub-pel refinement a ¼ pel motion vector is determined. Thus, the correct motion vector is identified for each moving object, and the generated motion vector field is highly correlated to the true motion.

In operation, the motion parameter engine is able to find true motion while balancing computational load and accuracy. Phase correlation and block matching are utilized to achieve the best results. Hierarchical block size matching is also implemented to minimize computational costs. To avoid trapping local motion, temporal constraints and object-based concepts of tracking back are utilized. By working with objects instead of pixels, a significant amount of computational power is saved, thus increasing the efficiency of the system. Bi-directional motion searches are also implemented to improve efficiency for un-occluded areas.

The motion parameter engine is able to be implemented in software, hardware or a combination of both.

An example implementation of the motion parameter engine is to take legacy videos, run them through the motion parameter engine which provides functions like video stabilization, noise reduction, resolution enhancement, Y/C separation and de-interlace, in addition to other possible features. The result is clear and stable video.

In order to speed-up the algorithm described herein, a motion estimation method using down-sampled frames is possible. Directly applying the previous motion estimation algorithm to the down-sampled frames only gives 4 pixel×4 pixel and ½-pel resolution motion vectors. In order to get 2 pixel×2 pixel and ¼-resolution motion vectors, a refinement search is applied to the up-sampled motion vector field. The refinement search is the same gradient descent search method described above, except that this time the search is done for every 2 pixel×2 pixel block motion vectors.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of estimating local motion in a video programmed in a memory of a device comprising:
   phase correlating a first extended block and a second extended block to determine one or more motion vector candidates, wherein the first extended block is a first block larger than a reference block and the second extended block is a second block larger than a current block, further wherein Fast Fourier Transforms are carried out on the first extended block and the second extended block;
   implementing a variable block search using the one or more motion vector candidates to determine a best motion vector, wherein the best motion vector has a lowest computation cost function relative to a pre-defined threshold, wherein implementing the variable block search comprises:
      splitting the current block into a set of 8 pixel×8 pixel blocks; performing an 8 pixel×8 pixel block search;
      else performing a 4 pixel×4 pixel block search, if the 8 pixel×8 pixel block search does not determine the best motion vector; and
      else performing a 2 pixel×2 pixel block search, if the 4 pixel×4 pixel block search does not determine the best motion vector; and
   implementing a predictive motion vector search and temporal tracking to ensure the best motion vector represents true motion.

2. The method as claimed in claim 1 wherein estimating local motion is bi-directional.

3. The method as claimed in claim 1 further comprising partitioning a picture of a video into a plurality of blocks.

4. The method as claimed in claim 1 wherein the first extended block corresponds to the reference block and the second extended block corresponds to the current block, further wherein the reference block is co-located with the current block.

5. The method as claimed in claim 1 further comprising implementing temporal tracking to determine whether the best motion vector is in motion.

6. A method of estimating local motion in a video programmed in a memory of a device comprising:
   determining motion in the video to be local motion;
   phase correlating a first extended block and a second extended block to determine one or more motion vector candidates, wherein the first extended block corresponds to a reference block from a previous frame and the second extended block corresponds to a current block from a current frame, further wherein the first extended block is a first block larger than the reference block and the second extended block is a second block larger than the current block, further wherein Fast Fourier Transforms are carried out on the first extended block and the second extended block;
   refining the one or more motion vector candidates by searching neighboring pixel positions;
   implementing a variable block search using the one or more motion vector candidates to determine a best motion vector, wherein the best motion vector has a lowest computation cost function relative to a pre-defined threshold, wherein implementing the variable block search comprises:
  splitting the current block into a set of 8 pixel×8 pixel blocks;
  performing an 8 pixel×8 pixel block search;
    else performing a 4 pixel×4 pixel block search, if the 8 pixel×8 pixel block search does not determine the best motion vector; and
    else performing a 2 pixel×2 pixel block search, if the 4 pixel×4 pixel block search does not determine the best motion vector;
implementing a predictive motion vector search to ensure the best motion represents true motion;
temporally tracking to determine whether the best motion vector is in motion; and
refining the best motion vector by searching the neighboring pixel positions.

7. The method as claimed in claim 6 wherein local motion estimating is bi-directional.

8. The method as claimed in claim 6 further comprising partitioning a picture of a video into a plurality of blocks.

9. The method as claimed in claim 6 wherein the reference block is co-located with the current block.

10. An apparatus for acquiring video and estimating local motion within the video, comprising:
  a non-transitory memory for storing an application, the application configured for:
    phase correlating a first extended block and a second extended block to determine one or more motion vector candidates, further wherein the first extended block is a first block larger than the reference block and the second extended block is a second block larger than the current block, further wherein Fast Fourier Transforms are carried out on the first extended block and the second extended block;
    implementing a variable block search using the one or more motion vector candidates to determine a best motion vector, wherein the best motion vector has a lowest computation cost function relative to a pre-defined threshold, wherein implementing the variable block search comprises:
      splitting the current block into a set of 8 pixel×8 pixel blocks;
      performing an 8 pixel×8 pixel block search;
        else performing a 4 pixel×4 pixel block search, if the 8 pixel×8 pixel block search does not determine the best motion vector; and
        else performing a 2 pixel×2 pixel block search, if the 4 pixel×4 pixel block search does not determine the best motion vector; and
    implementing a predictive motion vector search to ensure the best motion vector represents true motion; and
  a processor for executing the application.

11. The apparatus as claimed in claim 10 wherein estimating local motion is bi-directional.

12. The apparatus as claimed in claim 10 wherein the application is further for partitioning a picture of a video into a plurality of blocks.

13. The apparatus as claimed in claim 10 wherein the first extended block corresponds to a reference block and the second extended block corresponds to a current block, further wherein the reference block is co-located with the current block.

14. The apparatus as claimed in claim 10 wherein the application is further for implementing temporal tracking to determine whether the best motion vector describes true motion.

15. A method of estimating local motion in a video for each target block programmed in a memory of a device comprising:
  generating an extended block for phase correlation calculation, wherein the extended block is a block larger than a target block;
  determining motion vector candidates;
  splitting each target block into 8 pixel×8 pixel blocks and finding an associated motion vector from the motion vector candidates; and
  applying a variable block search if the associated motion vector is not found, wherein implementing the variable block search comprises:
    performing an 8 pixel×8 pixel block search;
      else performing a 4 pixel×4 pixel block search, if the 8 pixel×8 pixel block search does not determine the best motion vector; and
      else performing a 2 pixel×2 pixel block search, if the 4 pixel×4 pixel block search does not determine the best motion vector.

16. The method as claimed in claim 15 wherein the target block is 32 pixels by 32 pixels and the extended block is 64 pixels by 64 pixels.

17. A method of estimating local motion in a video programmed in a memory of a device comprising:
  phase correlating a first extended block and a second extended block to determine one or more motion vector candidates, wherein the first extended block is a first block larger than a reference block and the second extended block is a second block larger than a current block, further wherein Fast Fourier Transforms are carried out on the first extended block and the second extended block;
  implementing a variable block search using the one or more motion vector candidates to determine a best motion vector, wherein the best motion vector has a lowest computation cost function relative to a pre-defined threshold, and further wherein the variable block search includes:
    splitting a target block into a set of 8 pixel×8 pixel blocks;
    performing an 8 pixel×8 pixel block search;
    else performing a 4 pixel×4 pixel block search, if the 8 pixel×8 pixel block search does not determine the best motion vector; and
    else performing a 2 pixel×2 pixel block search using the motion vector candidates and a predictive motion vector, if the 4 pixel×4 pixel block search does not determine the best motion vector; and
  implementing a predictive motion vector search and temporal tracking to ensure the best motion vector represents true motion.

* * * * *